Patented Feb. 1, 1938

2,107,069

UNITED STATES PATENT OFFICE 2,107,069

STABILIZATION OF ALIPHATIC SYMMETRICAL ISO ETHERS

Theodore Evans, Berkeley, Calif., assignor to Shell Development Company, San Francisco, Calif., a corporation of Delaware No Drawing. Application August 17, 1936, Serial No. 96,471

5 Claims. (Cl. 23—250)

This invention relates to the stabilization of aliphatic ethers and it more particularly relates to a method of inhibiting the formation of oxidative impurities, as peroxides, in aliphatic ethers, particularly aliphatic mixed ethers and aliphatic symmetrical iso ethers. The invention also relates to stabilized compositions consisting of or comprising aliphatic mixed and/or aliphatic symmetrical iso ethers.

The aliphatic ethers, particularly the lower mixed ethers and the symmetrical iso ethers, when stored under ordinary storage conditions, even in glass containers, undergo considerable deterioration whereby the ether is contaminated with oxidative and other decomposition products which materially decrease its value for many commercial purposes. In some cases, due to their high peroxide content, further treatment, as distillation, of the stored ether or ether composition is hazardous. The ethers on standing usually deteriorate by reacting with oxygen to form peroxides, which in turn by interaction and/or spontaneous decomposition may yield aldehydes, ketones, acids and other impurities, the removal of which is in many cases a difficult and costly proceeding. The impurities formed in the aliphatic mixed ethers and aliphatic symmetrical iso ethers by spontaneous deterioration or auto-oxidation when such ethers are stored or shipped, alone or in admixture with one or more other materials, may for convenience be termed "oxidative impurities". This term is intended to embrace all such peroxides, aldehydes, ketones, acids and related contaminating impurities. The deterioration of the aliphatic mixed and symmetrical iso ethers increases with lapse of time, and is usually favored by: the presence of oxygen in the storage or shipping container; the presence, as is usual, of dissolved oxygen in the ether as manufactured; exposure to light, particularly direct sunlight; exposure to heat; exposure to air; exposure to pressure and the like.

It is an object of my invention to provide a practical and highly effective method for substantially inhibiting the formation of peroxides and other deleterious impurities in the ethers to which this invention relates when the same, either in the pure state or in admixture with other materials as hydrocarbons and the like, are stored, shipped or used for purposes where a stable ether or ether-containing mixture substantially free of peroxides and other oxidative impurities is desired.

It is another object of my invention to provide novel and useful compositions which are substantially stabilized against deterioration and peroxide formation and which consist of or comprise one or more aliphatic mixed ethers and/or one or more aliphatic symmetrical iso ethers. These stabilized compositions may be stored for relatively long periods of time, and they may be shipped for great distances in the conventional containers, without substantial peroxide formation or deterioration of the ether content of the composition. The stabilized compositions are useful for a wide variety of purposes and they are useful as raw materials in the production of a wide variety of products.

The process of my invention comprises incorporating with the ether to be stabilized or with the mixture comprising one or more of such ethers, by mixing or any other suitable means, a stabilizing amount of a phenolic body. By the term "stabilizing amount", I mean an amount of a phenolic body or mixture of phenolic bodies effective to stabilize the ether content of the treated material against deterioration, for example, against auto-oxidation resulting in peroxide formation.

The ethers stabilized in accordance with the invention are members of the class of ethers consisting of aliphatic mixed ethers and aliphatic symmetrical iso ethers. The aliphatic mixed ethers are ethers wherein two different aliphatic radicals are linked to an ether oxygen atom. The different aliphatic radicals may be straight chain radicals or branched chain radicals or one may be straight chain and the other branched. The radicals may be the residues of aliphatic normal- or iso-primary or secondary alcohols or they may be the radicals of aliphatic tertiary alcohols. The simplest aliphatic mixed ether is methyl ethyl ether. Other readily available aliphatic mixed ethers are: methyl propyl ether, methyl isopropyl ether, methyl normal butyl ether, methyl tertiary butyl ether, methyl amyl ether, methyl tertiary amyl ether, methyl hexyl ether, methyl tertiary hexyl ether, ethyl propyl ether, ethyl isopropyl ether, ethyl normal butyl ether, ethyl secondary butyl ether, ethyl tertiary butyl ether, ethyl amyl ether, ethyl secondary amyl ether, ethyl tertiary amyl ether, the ethyl hexyl ethers, the propyl butyl ethers, the propyl amyl ethers, etc. The homologues, analogues and substitution products of the above, as well as mixed ethers wherein one or both of the aliphatic radicals is/are unsaturated, as for example, ethyl isobutenyl ether, allyl isobutenyl ether, ethyl isopentenyl ether and the like, may be stabilized in accordance with the invention. The aliphatic mixed ethers possessing a methyl group linked to an ether oxygen atom as the methyl butyl ethers, etc., are usually more stable than the higher mixed ethers possessing radicals containing at least two carbon atoms. Under some conditions, the former may be sufficiently stable and may not require stabilization. However, the latter are very susceptible to auto-oxidation and must be stabilized if excessive peroxide formation is to be avoided when they are stored for even relatively short periods of time.

In the aliphatic symmetrical iso ethers, the aliphatic radicals linked to the ether oxygen atom are identical and the compound forms a chain at least doubly branched. The aliphatic radicals are the radicals of aliphatic iso-primary alcohols, normal- or iso-secondary alcohols or tertiary alcohols. The simplest aliphatic symmetrical iso ether is diisopropyl ether, which compound is particularly susceptible to auto-oxidation with the formation of peroxide. After standing for a short period of time, diisopropyl ether usually contains sufficient peroxide to render its purification by distillation, without a previous treatment to destroy the peroxide, extremely hazardous due to dangers of explosion.

Other readily available aliphatic symmetrical iso ethers which may be stabilized in accordance with the invention are: diisobutyl ether, disecondary butyl ether, ditertiary butyl ether, diisoamyl ether, the disecondary amyl ethers, the ditertiary amyl ethers, diisohexyl ether and the like, and their homologues and substitution products. The aliphatic unsaturated symmetrical iso ethers as diisobutenyl ether, diisopentenyl ether, disecondary pentenyl ether and the like may be stabilized in accordance with the invention.

The ether stabilizing agents or peroxide formation-inhibiting agents used in accordance with my invention are phenolic bodies. The term "phenolic body" as used herein and in the appended claims embraces those organic compounds containing an aromatic radical and at least one hydroxyl group, said hydroxyl group being linked to a carbon atom embraced in the nucleus of the aromatic radical. The phenolic bodies include phenol and its homologues and substitution products. A phenolic body may be mono- or polyhydric, that is, one or more carbon atoms embraced in the same or different aromatic radicals may be linked to hydroxy groups. Other hydrogen atoms of the aromatic compound may be replaced by suitable organic or inorganic substituents.

Suitable representative phenolic bodies are the following: phenol, the cresols, the naphthols, the anthrols, the xylenols, cumenol, carvacrol, thymol, eugenol, pyrogallol, catechol, resorcinol, hydroquinone, orcinol, guaiacol, phloroglucinol and the like as well as their homologues and analogues and suitable substitution products as the bromo- and chloro-phenols, -naphthols, -cresols, -anthrols, -xylenols, etc., chlorhydroquinone, dichlorhydroquinone, nitroso-phenol, the nitrosonaphthols, the hydroxy-diaryl ethers, the hydroxy-diaryl alkanes and the like. If desired, mixtures of the phenolic bodies may be used. For example, mixtures of phenolic bodies obtained as by-products in chemical and oil refining processes, such as "Trikresol", "Universal oil inhibitor" and the like are suitable.

The invention is not limited to the use of any specific proportion of the phenolic body or bodies. In some cases, the presence of the phenolic body in a concentration equal to about 0.001% by weight of the ether content of the material to be stabilized may be effective; in other cases, it may be desirable to use as much as about 3% or more of the phenolic body. The amount of the phenolic body to be used to stabilize the ether or ether composition to the desired extent will generally be dependent upon the specific stabilizing agent, upon the particular ether or ether composition to be stabilized, and upon the conditions to which the stabilized material will be subjected. In the majority of cases, the phenolic bodies have the desired effectiveness when employed in concentrations of from about 0.002% to about 2% by weight of the ether content of the material to be stabilized.

The phenolic bodies may be added to the material to be stabilized in any desirable manner. The phenolic bodies may be added per se or suspended or dissolved in a suitable media. It is in general desirable to select the specific stabilizing material with respect to the ether or ether composition to be stabilized so that the former is soluble to the desired extent in the latter. It may also be desirable to select the phenolic body with respect to the material to be stabilized so that it may, if desired, be subsequently separated therefrom by some convenient means as distillation, extraction, etc. When the substantially pure ethers are stabilized, it may be desirable to select a phenolic body which will not discolor the ether in which it is dissolved. For example, although in a particular case pyrogallol and hydroquinone may be equally effective, the latter is preferred if discoloration of the ether is to be avoided.

The material stabilized may consist of one or more aliphatic ethers of the class consisting of aliphatic mixed ethers and aliphatic symmetrical iso ethers. The invention also embraces within its scope the stabilization against deterioration and peroxide formation of the ether content of mixtures comprising one or more of such ethers in substantial amount. The ether or ethers to be stabilized may be in admixture with an organic solvent or diluent. Suitable organic solvents or diluents which may contain in solution one or more of such ethers and to which solution a phenolic body can be added to stabilize the ether content against deterioration and peroxide formation are the following: the aromatic and aralkyl hydrocarbons as benzene, toluene, xylene, ethyl benzene, cymene, etc.; the alicyclic hydrocarbons as cyclohexane, tetrahydrobenzene, etc.; the saturated as well as unsaturated aliphatic hydrocarbons, the hydrocarbon mixtures as gasoline, kerosene, fuel oil, Diesel oil, etc.; the halogenated hydrocarbons; and oxy-compounds as the alcohols, esters and the like.

To measure the rate of peroxide formation in some readily available aliphatic mixed ethers and aliphatic symmetrical iso ethers, and to demonstrate the effectiveness of some representative phenolic bodies in inhibiting peroxide formation, a series of tests were made, the results of which are given in the following examples. It is to be understood that the examples are for purposes of illustration; the invention is not to be regarded as limited to the specific ethers stabilized nor to the specific phenolic bodies and mixtures thereof recited.

Example I

Samples of about the same volume were drawn from the same stock of freshly prepared ethyl tertiary butyl ether and placed in glass sample bottles. One of the samples was stabilized with phloroglucinol, one with β-naphthol, and one with "Universal oil inhibitor" (a mixture of phenolic bodies). One sample, to serve as a blank, was not treated. In each case, the inhibitor was used in an amount corresponding to about 0.004 mol. of inhibitor per liter of ether stabilized. The bottles were closed with stoppers provided with capillary tubes to permit the contents of the bottles to have access to the atmosphere, and the bottles stored in a dark cabinet for six months. At the end of this time the samples were analyzed to determine the amount of peroxide formed during the storage period.

The peroxide was determined as follows: 2 c. c. of the ether were mixed with 10 c. c. of alcoholic potassium iodide solution, 2.5 c. c. of conc. acetic acid were added, and the liberated iodine titrated with a N/20 thiosulphate solution. When a 2 c. c. sample of ether is taken, each c. c. of thiosulphate solution consumed is equivalent to 0.00625 mol. of peroxide oxygen per liter of ether.

The results of the analyses are shown in the following table:

| Ether | Inhibitor | C. c. N/20 thiosulphate/2 c. c. ether | |
|---|---|---|---|
| | | Initial titration | Titration after 6 months |
| Ethyl tertiary butyl | None | 0.10 | 1.50 |
| Do | Phloroglucinol | 0.10 | 0.06 |
| Do | β-Naphthol | 0.10 | 0.08 |
| Do | "Universal oil inhibitor" | 0.10 | 0.08 |

These results show that while a considerable amount of peroxide was formed in the untreated sample, there was no peroxide formation at all in the stabilized samples.

Example II

Samples of ethyl tertiary butyl ether were placed in bottles as described in Example I and stored after being stabilized by the addition thereto of different phenolic bodies. In each case, the phenolic body was used in an amount corresponding to about 0.004 mol. of inhibitor per liter of ether. The samples were stored in a dark cabinet for 12 months. At the end of this time the peroxide content of the samples was determined as described in Example I. The results were as follows:

| Ether | Inhibitor | C.c. N/20 thiosulphate/2 c.c. ether | | Atoms of peroxide oxygen per liter of ether after 12 months |
|---|---|---|---|---|
| | | Initial titration | Titration after 12 months | |
| Ethyl tertiary butyl | None | 0.10 | 5.50 | 0.07 |
| Do | β-Naphthol | 0.10 | 0.15 | |
| Do | α-Naphthol | 0.10 | 0.10 | |
| Do | Hydroquinone | 0.10 | 0.50 | |
| Do | Pyrogallol | 0.10 | 0.30 | |
| Do | Resorcinol | 0.10 | 0.50 | |
| Do | "Trikresol" | 0.10 | 0.15 | |
| Do | "Universal" | 0.10 | 0.10 | |
| Do | Nitroso-β-naphthol | 0.10 | 0.10 | |

Example III

Three 200 c. c. samples of a freshly prepared stock of ethyl tertiary amyl ether were charged to separate tin cans. One of the samples was not treated; the other two samples were treated with 0.2 c. c. of "Trikresol" and 0.1 gm. of hydroquinone, respectively. The cans were then stoppered and stored for 96 days. At the end of this time the peroxide content of the samples was determined as described in Example I.

It was found that the untreated sample contained 0.32 gm. of peroxide oxygen ($O_2$) per liter of ether, while the stabilized samples were substantially peroxide free.

Example IV

The following table illustrates the peroxide inhibiting effect of "Trikresol" and hydroquinone on ethyl tertiary amyl ether. Two 200 c. c. samples of the same stock of ether were treated with "Trikresol" and hydroquinone, respectively, while one sample was untreated for purposes of comparison. The table shows the peroxide content of the samples after three months and after seven months storage in tin cans.

| Ether | Inhibitor | Gm. peroxide oxygen/liter of ether | |
|---|---|---|---|
| | | After 3 months | After 7 months |
| Ethyl tertiary amyl | None | 0.32 | 1.04 |
| Do | 0.2 c.c. "Trikresol" | 0.05 | 0.13 |
| Do | 0.1 gm. hydroquinone | 0.01 | 0.01 |

Example V

The following table shows the effectiveness of various representative phenolic bodies in inhibiting peroxide formation in ethyl tertiary amyl ether stored in glass containers for a period of seven months.

| Sample | Gm. peroxide oxygen per liter of ether |
|---|---|
| 100 c. c. ether—no inhibitor | 1.28 |
| 100 c. c. ether + 0.05 gm. α-naphthol | 0.02 |
| 100 c. c. ether + 0.05 gm. hydroquinone | 0.01 |
| 100 c. c. ether + 0.05 c. c. "Trikresol" | 0.01 |
| 100 c. c. ether + 0.05 c. c. "Universal oil inhibitor" | 0.01 |

Example VI

The following table illustrates the effectiveness of phenolic bodies in inhibiting peroxide formation in diisopropyl ether on storage in glass or metal containers over long periods of time.

| Samples | Equivalents peroxide oxygen per liter of ether | | |
|---|---|---|---|
| | 3 months | 7 months | 10 months |
| *Stored in tin cans* | | | |
| 200 c. c. diisopropyl ether—no inhibitor | 0.27 | 0.61 | 0.70 |
| 200 c. c. diisopropyl ether+0.1 gm. hydroquinone | 0.0025 | 0.0012 | 0.0012 |
| *Stored in glass* | | | |
| 100 c. c. diisopropyl ether—no inhibitor | 0.097 | 0.19 | 0.28 |
| 100 c. c. diisopropyl ether+0.05 gm. β-naphthol | 0.0025 | 0.0025 | 0.0012 |
| 100 c. c. diisopropyl ether+0.05 gm. hydroquinone | 0.0012 | 0.0037 | 0.0025 |
| 100 c. c. diisopropyl ether+0.05 gm. "Trikresol" | 0.0012 | 0.0012 | 0.0025 |
| 100 c. c. diisopropyl ether+0.05 gm. "Universal oil inhibitor" | 0.0012 | 0.0012 | 0.0012 |

While I have described my invention in a detailed manner and provided examples illustrating suitable modes of executing the same, it is to be understood that modifications may be made and that no limitations other than those imposed by the scope of the appended claims are intended.

I claim as my invention:

1. A composition of matter stabilized against peroxide formation which comprises an aliphatic symmetrical iso ether and a stabilizing amount of a phenolic body selected from the group consisting of the cresols, the naphthols, pyrogallol, hydroquinone, resorcinol, phloroglucinol and nitroso-beta-naphthol.

2. A composition of matter stabilized against peroxide formation which comprises diisopropyl ether and a stabilizing amount of a phenolic body selected from the group consisting of the cresols, the naphthols, pyrogallol, hydroquinone, resorcinol, phloroglucinol and nitroso-beta-naphthol.

3. A composition of matter stabilized against peroxide formation which comprises diisopropyl ether and a stabilizing amount of a naphthol.

4. A composition of matter stabilized against peroxide formation which comprises an aliphatic symmetrical isobutyl ether and a stabilizing amount of a phenolic body selected from the group consisting of the cresols, the naphthols, pyrogallol, hydroquinone, resorcinol, phloroglucinol, and nitroso-beta-naphthol.

5. A composition of matter stabilized against peroxide formation which comprises an aliphatic symmetrical isoamyl ether and a stabilizing amount of a phenolic body selected from the group consisting of the cresols, the naphthols, pyrogallol, hydroquinone, resorcinol, phloroglucinol, and nitroso-beta-naphthol.

THEODORE EVANS.